July 1, 1947.  R. KOECHLIN  2,423,103
SYSTEM FOR MEASURING FREQUENCY DEVIATIONS
Filed June 22, 1943  5 Sheets-Sheet 1
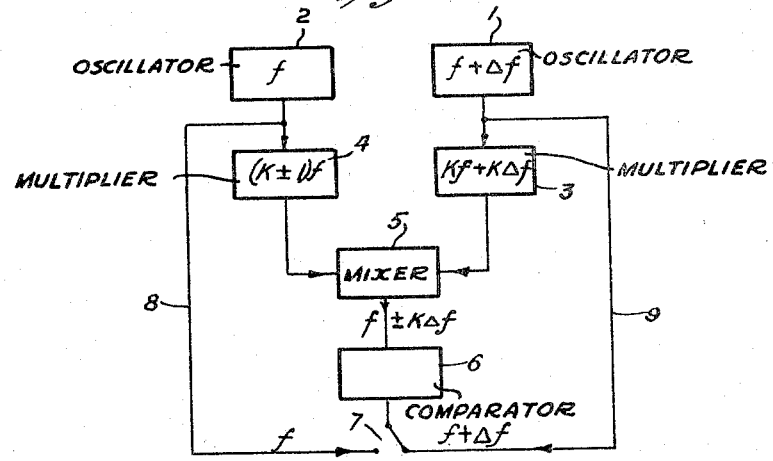
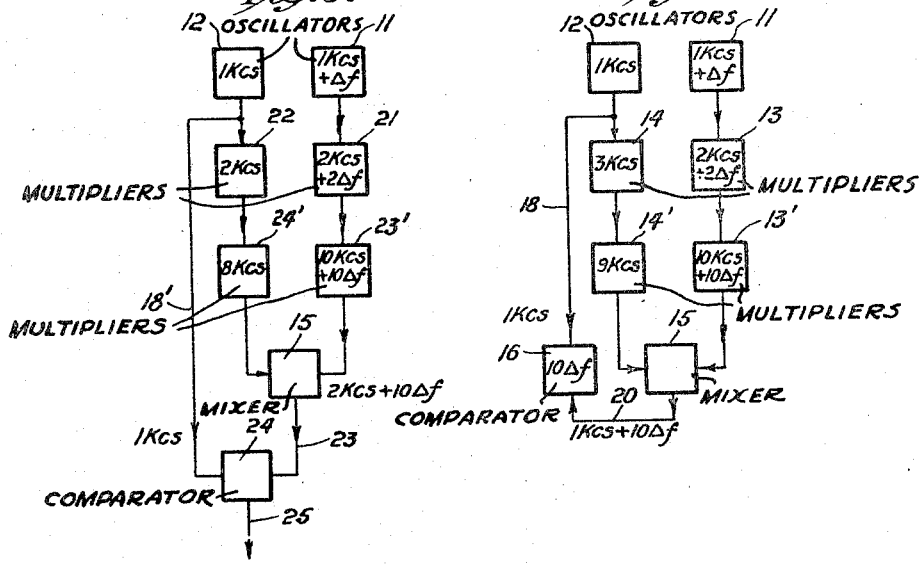
INVENTOR.
RENAUD KOECHLIN
BY
Edward D. [signature]
AGENT July 1, 1947.   R. KOECHLIN   2,423,103
SYSTEM FOR MEASURING FREQUENCY DEVIATIONS
Filed June 22, 1943   5 Sheets-Sheet 2
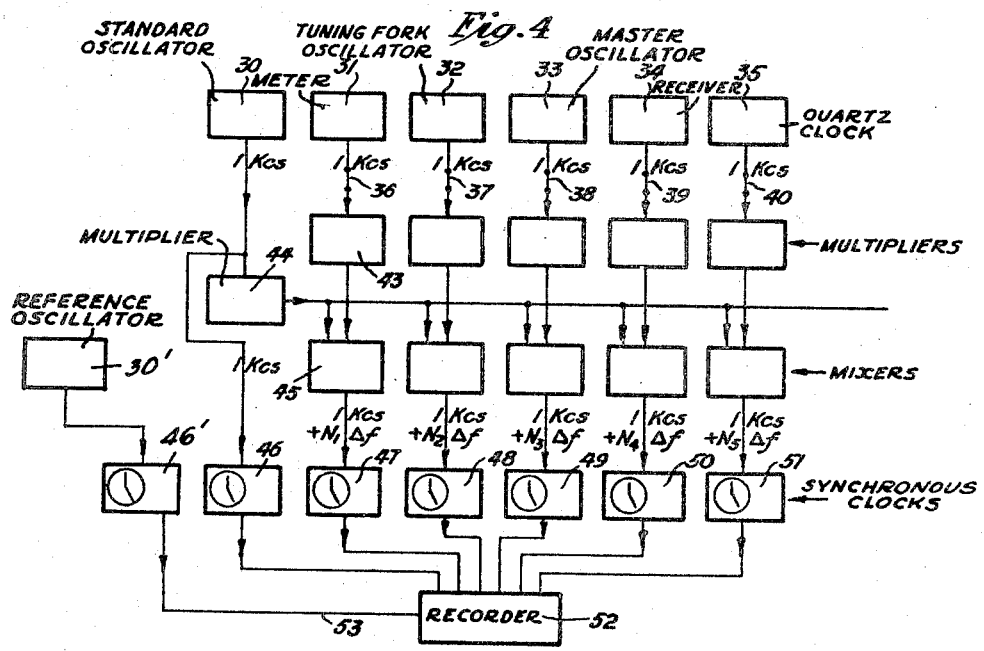
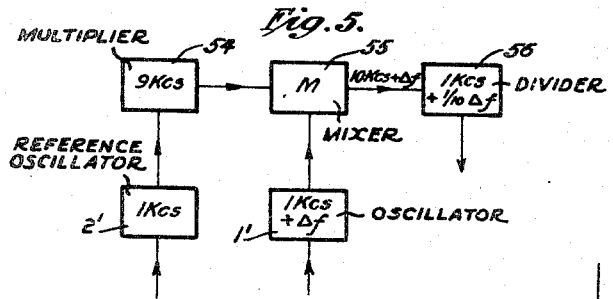
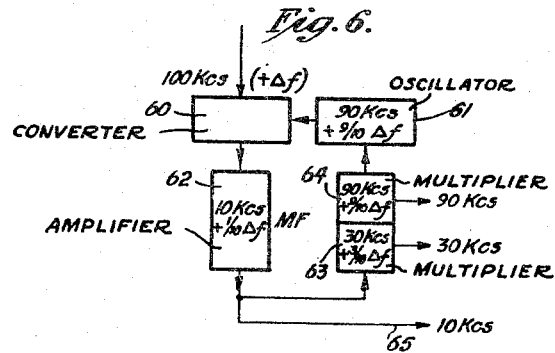
INVENTOR.
RENAUD KOECHLIN
BY
AGENT

INVENTOR.
RENAUD KOECHLIN
BY
AGENT

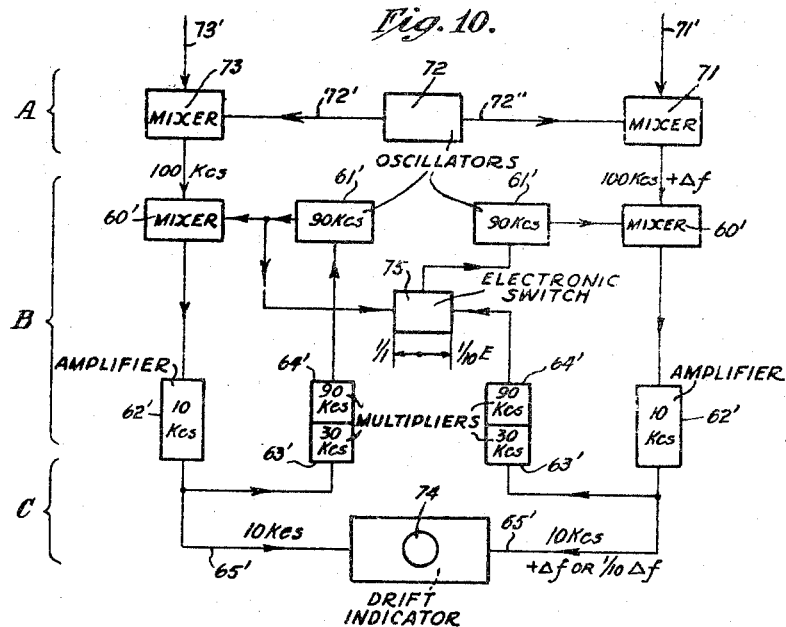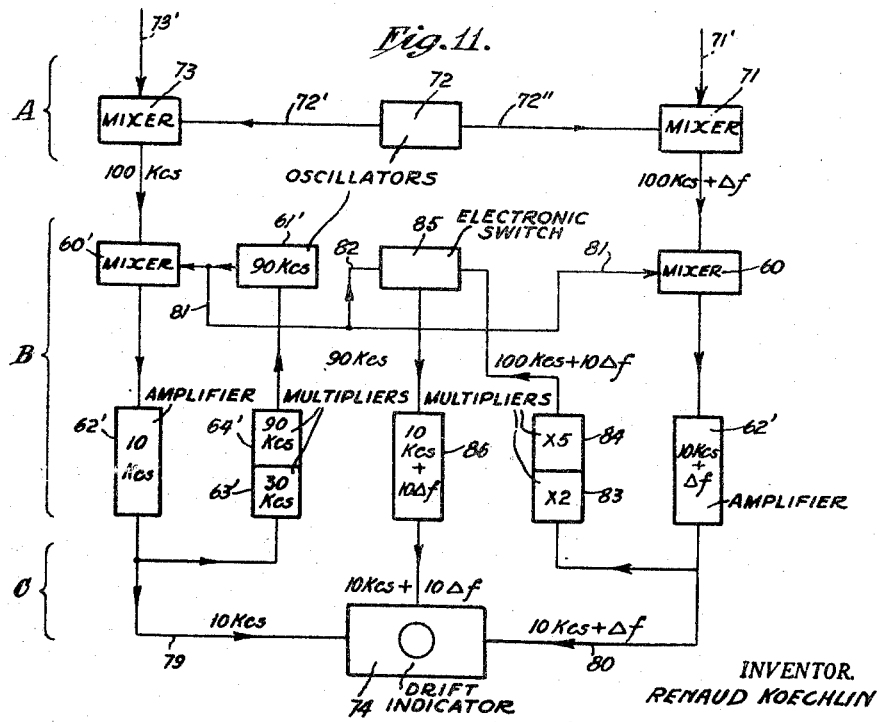

July 1, 1947.                R. KOECHLIN                2,423,103
                SYSTEM FOR MEASURING FREQUENCY DEVIATIONS
                    Filed June 22, 1943        5 Sheets—Sheet 5
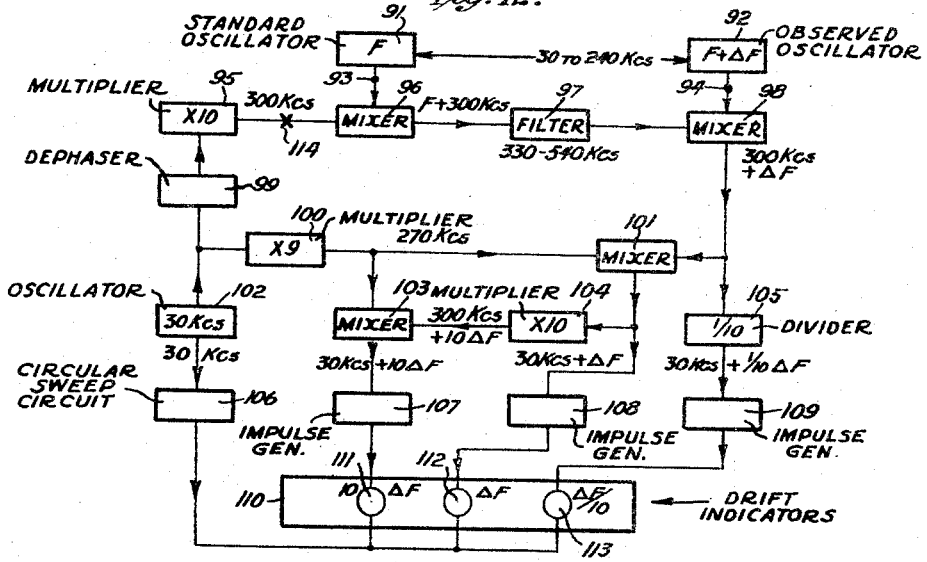
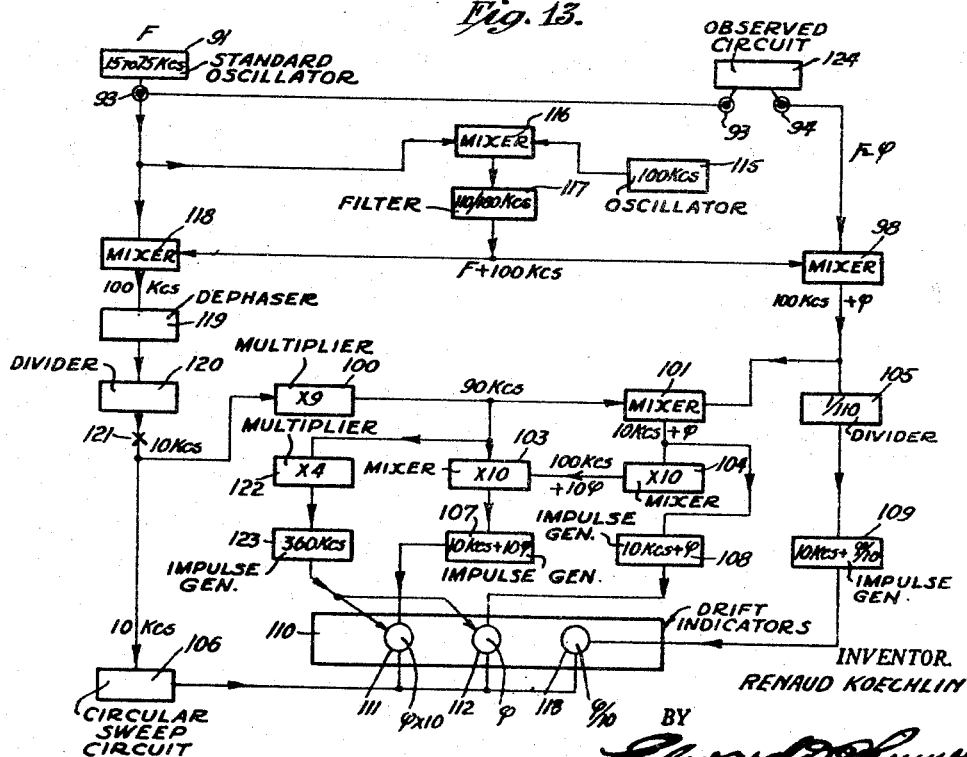
INVENTOR.
RENAUD KOECHLIN
BY
AGENT Patented July 1, 1947

2,423,103

UNITED STATES PATENT OFFICE 2,423,103

SYSTEM FOR MEASURING FREQUENCY DEVIATIONS

Renaud Koechlin, Boulogne-Billancourt, France, assignor to International Standard Electric Corporation, New York, N. Y., a corporation of Delaware Application June 22, 1943, Serial No. 491,802
In France October 7, 1941

14 Claims. (Cl. 172—245)

This present invention concerns systems for comparing and measuring deviations or drifts of electric quantities, especially but not exclusively applicable to the measurement or comparison of differences of frequencies and phases of electrical oscillatory currents.

In the comparison of phases or frequencies of electrical oscillations, measurements are often rendered difficult or delicate because the variation to be shown is too small or too large, and it is therefore necessary, in order to effect this comparison, to provide means for increasing or reducing the value of this variation in regard to the corresponding characteristic of the electrical oscillatory current.

One general object of this invention is, therefore, to provide means for multiplying or dividing deviations or differences of frequencies and of electrical phases, as well as to utilize these multiplied or divided deviations or drifts.

Another object of this invention is to provide methods of division of frequencies, capable of being used at high frequencies.

Another object of this invention is to provide means permitting one to transform to a fixed frequency of determined value, the two frequencies to be compared, in such a way as to allow the measurement or use of the drifts on a single frequency.

Another object of the invention is to provide means permitting one to bring back upon a fixed determined frequency the variation of the incident frequency with reference to another frequency, the latter two bein gunstable.

Another object of the invention is to provide apparatus for measuring or comparing drifts or deviations of frequency or of phase by direct, continuous observations, as by using the apparatus hereinafter described.

According to certain of its characteristic features, this invention provides means for showing a relative drift of two frequencies brought back to the same comparison frequency by dividing and/or multiplying, by means of beating with auxiliary frequencies.

In the case where the comparison frequency happens to be the same as the frequencies to be compared, the multiplication of the drift may be made, according to one embodiment of this invention, by multiplying one of the frequencies to be compared, for example the reference frequency, by the factor $k\pm1$ and the other frequency, or frequency to be observed, by the factor $k$. These multiplied frequencies are then made to beat together in order to obtain a beat oscillation at the comparison frequency—thus permitting one to re-establish the original frequency of the oscillations to be compared. The difference frequency obtained keeps the multiplication of the drift by the factor $k$, by which one has acted upon the frequency to be observed.

The division of the drift in this same case may be effected, according to another embodiment of the invention, by multiplying for example the reference frequency by a factor $k\pm1$ and by then making it beat with the variable frequency. One thus obtains a beat frequency $k$ times higher, keeping constant the drift of the frequency to be studied with respect to the reference frequency. Then one divides this beat frequency by the factor $k$. The resulting frequency recovers the original value of the oscillations to be compared, but possesses a drift equal to the original drift divided by $k$.

In a case where the frequencies to be compared, entering into the apparatus, may have a relationship $k$ with the frequencies leaving the apparatus, to feed the comparator or the apparatus used, the division of the drift may be made, according to one use of the invention, by changing the frequency by an auxiliary synchronized oscillator permitting one to perceive the action. Each of the two frequencies to be compared is divided by a factor $k$ by means of a change in frequency in which one of the frequencies may be the incident frequency and the other a frequency obtained from an auxiliary oscillator placed at any point in the circuit. This oscillator is synchronized with the average frequency or with one of its harmonics, which assures the division of the drift at the time of the change in frequency.

In order to obtain a multiplication of the drift, one multiplies, according to another embodiment of the invention, the output frequency displayed, by the drift obtained from a changer stage of the frequency to be observed. After that one brings about a new change in frequency in order to bring back the multiplied frequency to the comparison frequency with a multiplied drift.

According to another of its uses, this invention provides in such circuits for the use of a first change in frequency simultaneously upon two paths in order to bring back the frequency of an oscillation to be observed to a fixed value, such as that at the input of the drift multiplying or dividing apparatus. The reference path which is now obtained from an oscillation of the same frequency as the oscillation to be observed, or in harmonic relation with it, is subjected, as well as the path of the oscillation to be observed, to a first change in frequency by means of suitably fixed auxiliary oscillation common to the two paths.

Such a change in frequency simultaneously, upon two paths, has the known property of keeping constant the phase relations between the two incident frequencies in spite of the variations of frequency of the adjusting oscillator. Nevertheless, the value of the average frequency resulting from the changes in frequency varies with the frequency of the adjusting oscillator. In certain cases, when the measuring circuits are complex and sensitive to the variations of frequencies, the variation of the average frequency may give rise to errors in measurement, especially for phase angles of very small magnitude.

In order to avoid this inconvenience, the invention provides, according to another variation, a method permitting one to bring back the drift or phase angle to a frequency which is exactly that for which all the circuits have been adjusted. This process consists in obtaining the average frequency $f$ of the apparatus on which one superposes the drift to be shown, by making the input frequency $F+\Delta F$ beat with a frequency $F+f$ itself, obtained by making the reference frequency $F$ beat in an auxiliary mixer with a frequency $f$, produced by a generator of fixed frequency.

A variation of this method, especially suitable for measuring phases, consists, according to another form of the invention, in obtaining the frequency $F+f$ as indicated above, and in obtaining the two average frequencies $f$ on the one hand and $f+\Delta f$ on the other hand, by supplying a mixer upon each of the paths with the frequency $F+f$ and the respective frequencies $F$ and $F+\Delta F$. This procedure presents the advantage of assuring a better symmetry between the two paths, especially relative to the de-phasing introduced by a band pass filter serving to isolate the frequency $F+f$.

If the band of frequencies does not agree with the desired purpose one may, according to another use of this invention, arrange the apparatus which has just been described for a change in frequency in two known steps. In this manner the regulation of the frequency of the two-step changer-oscillator will not be critical. Especially at high frequencies, the stability of this oscillator will no longer play an important part.

According to still other forms, this invention provides apparatus for measuring drifts of phases or of frequencies incorporating the preceding arrangements. The drift multiplier and divider circuits, preceded or not by frequency changer circuits, may now serve to supply indicators of any type whatever, synchronous clocks, mechanical or electrical differential indicators, beat counters, oscillographs using cathode rays, etc. Means may also be provided for obtaining simultaneous indications of the multiplied and/or divided drift and of the actual drift, in order to permit the use of a single apparatus over a large range of drifts or variations of frequencies and of phases.

Finally one of the features of this invention resides in the superposition of drifts of a determined frequency for any relationship of multiplication or division, which presents a particular advantage, in that it makes it easy to obtain multiple indications on the same apparatus.

These objects and features, as well as still others, are shown in detail in the following description given in relation to the attached drawings in which:

Fig. 1 shows schematically a drift multiplier circuit in which the value of the frequencies to be compared lends itself to a direct comparison;

Fig. 2 shows schematically an example of an application of the circuit of Fig. 1, with numerical values given;

Fig. 3 shows schematically an example of the adaptation of the circuit of Fig. 2 to a system for comparison at a remote point;

Fig. 4 shows schematically an example of the application of drift multiplier circuits of Figs. 1 and 2 to the measurement of time or of frequencies by synchronous clocks;

Fig. 5 shows schematically a drift divider circuit using a fixed frequency;

Figs. 6 and 7 show, respectively, two schematic examples of frequency divider circuits with a synchronized changer of frequency, thus permitting one to secure a drift division;

Fig. 10 shows schematically one example of the application of the circuit of Fig. 6 to an apparatus for measuring drift and synchronization;

Fig. 11 shows schematically an example of one application of Fig. 9 to an apparatus for measuring drift and synchronization;

Fig. 12 shows schematically a drift comparator using certain circuits in the preceding figures;

Fig. 13 shows drift or phase comparator apparatus incorporating certain circuits of the preceding figures.

Figure 7:
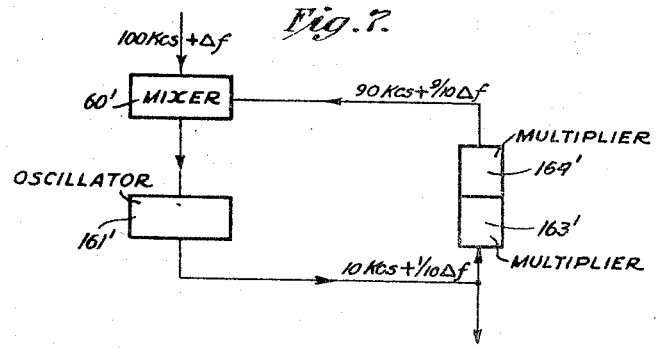

In order to make evident for example a variation in frequency or drift $\Delta f$ of an oscillation of frequency $f$, when this drift is very small, one may use the circuit represented schematically in Fig. 1. In this figure, the reference number 1 designates the source of the frequency to be observed. This source may either consist of an actual energy source such as a known vacuum tube oscillator, or it may be an apparatus to receive or repeat the oscillation to be observed. Reference number 2 designates the source of the oscillation taken as a reference, such as a known multi-vibrator controlled by a crystal oscillator. The frequency of this source of oscillation 2, is the same as the frequency of the source to be studied, but is assumed to be stable, in comparison with the variations of the source 1. As shown, the oscillation of the source 1 is subjected in the circuit 3 to a multiplication of frequencies by a factor $K$. The reference oscillation furnished by the circuit 2 is subjected to a multiplication by the factor $K \pm 1$ in the circuit 4. Circuits 3 and 4 consist of any convenient type of frequency multiplier, such as an amplifier giving a multiple harmonic of the frequency applied to its grid.

The oscillations, at frequencies thus multiplied, are made to beat together in a mixer circuit 5 in order to re-establish the comparison frequency $f$. Nevertheless, as is well known in the art, the change of frequency obtained by the beating of two frequencies does not change the absolute value of the variation $\Delta f$ of one frequency with respect to the other and the oscillation leaving the mixer will have a frequency $f \pm K\Delta f$.

The comparison of this frequency with the reference frequency $f$ in the comparator circuit 6 (switch 7 in the left hand position), the frequency $f$ being then carried through the wire 8, will show the drift multiplied by $k$. The comparison of the frequency $f \pm K\Delta f$ with the frequency $f+\Delta f$ carried through the wire 9 (the switch 7 being in the right position) will give $(K\pm 1)\Delta f$.

Fig. 2 shows schematically an example of the application of the circuit of Fig. 1 with a view of the comparison of two frequencies of one kilocycle per second. The reference frequency of 1 kilocycle furnished by the circuit 12 is multiplied by means of two stages 14, 14' by the factor 3 each time to attain a frequency of 9 kilocycles per second. The frequency to be observed, furnished by the circuit 11, is multiplied by the circuits 13 and 13' with the coefficients 2 and 5 respectively, to attain a frequency of 10 kilocycles per second $+10\Delta f$. These two multiplied frequencies are now made to beat in the mixer stage 15, at the output of which the oscillation has a frequency of 1 kilocycle per second $+10\Delta f$. This frequency is conducted to the comparator 16 through the wire 20 while the reference frequency of 1 kilocycle coming from the circuit 12 is conducted to the comparator 16 through the connection 18.

For certain relationships of multiplication it will be easier to effect the change in frequency, not with $f$ or $f+\Delta f$, but with one of their multiples. This arrangement is particularly convenient in case one wishes to send the two frequencies over the same pair of wires: i. e. the reference frequency, and the frequency possessed by the drift, respectively. Upon arrival at a distant point, separation will be effected by filters and the comparison made by any appropriate indicator.

Fig. 3 shows schematically an example of such an apparatus. 11 and 12 show respectively the sources of frequencies to be observed and reference numerals 21 and 22 the respective stages doubling the frequency for these oscillations. The frequency leaving the circuit 21 is multiplied by 5 in the circuit 23' and the frequency leaving the circuit 22 is multiplied by 4 in the circuit 24'. The two frequencies thus obtained are made to react on one another in the mixer circuit 15. The output oscillation will then have a frequency of 2 kilocycles per second $+10\Delta f$. This frequency is conducted through the wire 23 into a suitable apparatus 24, terminating the line 25, which latter may be telephonic, for example, at the same time that the standard frequency of one kilocycle per second is conducted through the wire 18'.

The forms of apparatus for drift multiplication which have just been described may, for example, find an application in the measurement of average time or of average frequency of a certain number of standard sources. Fig. 4 shows schematically such an example of time measurement by means of synchronous clocks. In this figure there are indicated six reference sources. Source 30 shows a standard oscillator of 100 kilocycles per second whose output frequency is divided to 1 kilocycle per second. Reference source 31 shows a frequency meter based on the comparison principle placed in any suitable measuring central point whatever, the basic frequency of which, divided to one kilocycle, is conducted through a telephone line 36 to the central point of measurement. Source 32 shows a tuning fork oscillator whose frequency of one kilocycle is likewise conducted to the central point of measurement through the line 37. Source 33 shows a master oscillator of a radio broadcasting station whose frequency is brought back to 1 kilocycle and transmitted to the central point of measurement through the line 38. Source 34 shows a receiver for receiving standard waves whose reception frequency of one kilocycle is transmitted to the measuring apparatus through the line 39 and source 35 shows, for example, a quartz clock, an oscillator well known in the art, the frequency of which, of one kilocycle, is conducted to the central point of measurement through the line 40.

The standard frequency of oscillator 30 is multiplied by the circuit 44, corresponding to the multiplier circuit 4 of Fig. 1. The other frequencies conducted through the line are multiplied by the circuits 43, analogous to the circuit 3 of Fig. 1. The multiplied frequency 44 and each of the multiplied frequencies 43 supply mixers 45, these latter being analogous, for example, to the mixer 5 of Fig. 1. At the output of these mixers one thus obtains oscillations of a frequency of 1 kilocycle with a drift multiplied by the coefficient of multiplication desired, thus giving the drifts $N_1\Delta f_1$, $N_2\Delta f_2$, $N_3\Delta f_3$, $N_4\Delta f_4$ and $N_5\Delta f_5$.

The synchronous clocks, 46 to 51, indicating frequency comparators of frequency meters well-known in the art are respectively supplied by the standard frequency coming from the oscillator 30 and by the frequencies leaving the mixers 45. These clocks are all connected to a simultaneous multi-tracing recording apparatus, 52, of known type which shows the various drifts between the different clocks, and in relation to the beats of the reference clocks 46' controlled by a reference oscillator 30', also conducted through the line 53. As will be apparent, one may obviously use recorders based upon a different mode of action.

With such an arrangement, on the one hand the sensitivity of measurements is increased, which permits one to show the smallest displacement and on the other hand, the time necessary for showing a displacement between the sources is reduced. This reduction of the measuring time is especially important in the case where the standard frequency is only received at a point during very short periods, in order to permit the use of this frequency for the adjustment of local apparatus (in the case for example of frequency meters, which one wishes to standardize by radio).

When the drift is, on the contrary, too rapid to furnish convenient observations (higher than the circumferential extent of the dial of an indicator instrument, for example) it becomes desirable to divide the drift instead of multiplying it. The scheme of Fig. 5 may then, for example, be used according to another form of this invention.

In this figure a standard reference frequency of, for example, 1 kilocycle per second is furnished by the circuit 2' and multiplied in any appropriate manner in the circuit 54, by a factor equal to 9 in the example shown. This multiplied reference frequency is then made to pulsate in a mixer 55, with the frequency to be observed (1 kilocycle$+\Delta f$) from oscillator circuit 1', in such a way as to furnish a beat oscillation of 10 kilocycles per second$+\Delta f$, since the absolute variation of the frequency to be observed has not been affected by the mixer 55. The beat oscillator is then brought back to the comparison frequency of 1 kc./s. by division of the frequency in a well-known manner in the circuit 56, the division affecting at the same time the frequency of 10 kc./s and the drift $\Delta f$. The resultant oscillation of 1 kc./s. plus $\frac{1}{10}\Delta f$ is now applied on the comparator or other circuit used, at the same time as the reference frequency of circuit 2', in order to furnish the indication of divided drift.

Up to now, the described forms of apparatus have been considered in the case where the comparison frequency has the same value as the frequencies to be compared, in other words in the case where the frequencies to be compared have a convenient value, or in a direct comparison. The changes of frequency used have therefore only served to allow us to obtain the desired drift divisions or multiplications.

However, when the operating frequency of the comparison apparatus can not in practice be the same as that of the oscillations to be compared, it is necessary to provide means for multiplying and dividing the drift, in association with means for effecting a change in frequency, permitting one to bring back the frequencies to be compared to a convenient value.

By way of example, Fig. 6 shows, according to one form of this invention, a circuit permitting one to divide the frequency of an oscillation, while at the same time assuring a division of the drift of this oscillation. The oscillation of a frequency of 100 kc./s.$+\Delta f$, for example, is conducted to a stage comprising a well-known frequency converter 60, the separate oscillator, 61, of which, has a frequency of 90 kc./s.$+\frac{9}{10}\Delta f$, in such a way as to obtain in the output circuit or amplifier, 62, a frequency of 10 kc./s$+\frac{1}{10}\Delta f$ which will be transmitted through the wire 65 to any appropriate circuit used for observation thereof. In order to assure a division and not a change in frequency, and therefore a division of the drift $\Delta f$, it is convenient to synchronize the oscillator 61 with the aid of a harmonic of the average frequency of the circuit 62. For this purpose there has been indicated on the figure two frequency multiplier stages 63 and 64 bringing the frequency derived from the circuit 62 to 90 kc./s.$+\frac{9}{10}\Delta f$, i. e., the frequency of the oscillator 61. The oscillator 61 will cause a division of the drift of the oscillation to be observed at the same time as a division of its beat frequency, because, if the oscillator tends to drift, the beat frequency will tend to vary, thus bringing back the oscillator to its original frequency by synchronization.

One variation of such a frequency and drift divider circuit is given in Fig. 7. In this figure, the oscillator 161' is adjusted for a beat frequency of 10 kc./s.$+\frac{1}{10}\Delta f$ and its frequency multiplied by the circuits 163' and 164' is brought to 90 kc./s.$+\frac{9}{10}\Delta f$ in order to supply directly the frequency converter as mixer 60'.

Figure 8:
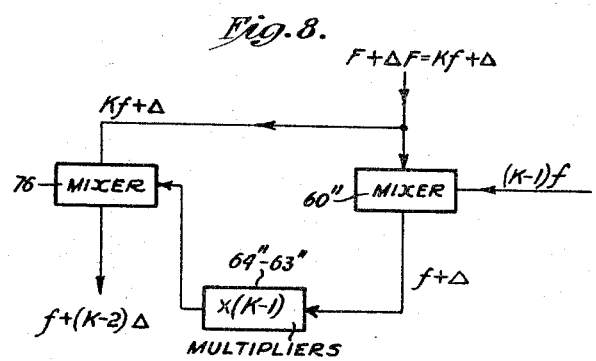
Figs. 8 and 9 show schematically two examples of drift multiplier circuits using an output frequency different from the input frequency.
Figure 9:
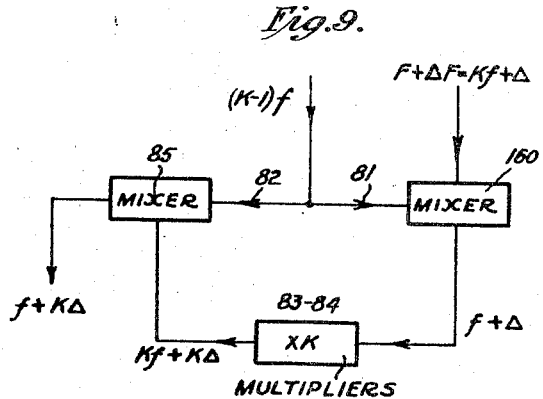

In order to multiply a drift, in the case where the comparison frequency must necessarily be different from the frequencies to be compared, this invention provides, according to certain embodiments, for the use of such circuits as represented in Figs. 8 and 9. In the circuit of Fig. 8, the oscillation to be observed, of frequency $kf+\Delta$, is introduced into a mixer 60'' with the frequency $(k-1)f$ obtained by any means whatever from the reference frequency F or $kf$. One obtains at the output of the mixer 60'' a frequency $f+\Delta$, which one multiplies by $(k-1)$ in the circuits 63'' and 64'' and which one reintroduces into a mixer 76 at the same time as is present therein the oscillation of frequency $kf+\Delta$. At the output of the mixer 76, one therefore obtains an oscillation of frequency $f+(k-2)\Delta$. The drift has thus been multiplied by $(k-2)$, and this multiplied drift may be ascertained by comparison with the reference frequency $f$ or $F/k$.

In the circuit of Fig. 9, the oscillation to be studied $kf+\Delta$ is introduced into the mixer 160 with a frequency $(k-1)f$ obtained by any means whatever from the reference frequency F or $kf$, provided through the wire 81. The average frequency $f+\Delta$ is now multiplied by $k$ in the circuits 83—84 and the oscillation at a multiplied frequency $kf+k\Delta f$ is introduced into another mixer 85 at the same time that the frequency $(k-1)f$ is supplied thereto through the wire 82. At the output of the mixer 85, one therefore obtains a frequency $f+k\Delta$, the drift remaining multiplied by $k$ and this multiplied drift can be ascertained by comparison with the reference frequency $f$ or $F/k$.

The drifts or variations in frequency thus multiplied or divided by circuits such as are represented in Figs. 1, 2, 3, 5, 6, 7, 8 and 9, for example, may now be used in any desired manner and may conveniently be measured by comparison with a reference frequency (a frequency whose variations are assumed to be very small with respect to the variations of the frequency to be observed).

In general, these measuring instruments may consist of 3 distinct elements; a frequency changer apparatus adaptable to two paths A, serving to bring back the oscillation to be observed to a convenient value and in definite phase relation with the reference oscillation; an assembly of circuits B permitting the multiplication and/or the division of the drift, and consisting of any of the circuits above described, or of an appropriate combination of these circuits; and an indicator or comparator device of any suitable electro-mechanical or electronic type, C. One should furthermore note that in certain cases, the first element (adaptable frequency changer) may be useless unless the oscillation to be observed has a frequency which lends itself to a direct comparison with a reference frequency, which is, for example, the case in the applications mentioned in Figs. 2 to 5, having specific values.

Fig. 10 shows schematically an example of an apparatus for measurement of drift and synchronization in which the apparent degree of deviation is divided by the factor 10 to obtain a more accurate measurement. In the circuit shown one compares an incident wave of high frequency, introduced through line 71' into the mixer 71 with an oscillation, of standard frequency, introduced through line 73' into the mixer 73 and coming, for example, from a frequency meter not shown. These two frequencies are subjected at A to a first change in frequency by introducing simultaneously along two paths 72' and 72'', the frequency of a common oscillator 72, in order to bring them back to the fixed value at the input to the drift divider apparatus B. To facilitate the understanding of the operation, the numerical values given by way of simple illustration are the same as those of the circuit of Fig. 6, the frequencies to be compared at the input to the apparatus being 100 kc./s. and the comparison being effected at a frequency of 10 kc./s.

The working of the assembly B of the circuits permitting the division of the drifts may be shown as follows. The average reference frequency of 100 kc./s. is divided by the factor 10 in a circuit analogous to that of Fig. 6, and in which the corresponding elements are designated by the same reference numbers modified by a prime ('). This circuit could obviously be replaced by that of Fig. 7, for example. One thus obtains, in the connection 65', the 10 kc./s. of reference.

The average frequency of 100 kc./s. to be observed is also introduced into a circuit analogous to that of Fig. 6 and in which the elements are designated by the same numerical references. One thus obtains in the wire 65', the frequency to be observed, brought back to 10 kc./s. with its drift $\Delta f$ divided by 10. Nevertheless, as it is also desirable to obtain the actual drift $\Delta f$ of the oscillation at 100 kc./s. upon the frequency of 10 kc./s., the hand or electronic type switch permits one to synchronize the oscillator 61' either by the circuits 63'—64' to obtain a drift divided by 10, or by the oscillator 61' of the standard path, in order to obtain an undivided drift. This undivided drift will also be transmitted through the wire 65' to the indicator 74.

The indicator or comparator, 74, of part C of the apparatus may be of any desired type as above mentioned, but preferably may consist of an indicator without inertia for direct reading, such as a cathode ray oscillograph. The sweep of the oscillograph is now governed by the reference frequency which is applied through the wire 65', this sweep being "modulated" or deformed by the frequency to be observed, this latter being applied through the wire 65' and transformed in a series of impulses by means of any known circuit for this purpose. A method of indication particularly useful for the measurement of angles of drift or of phase is one consisting of causing a circular sweep upon the screen of the cathode ray indicator 74, by the reference frequency and causing indications of drift or of phase in the form of radial deviations to appear. By well known methods, one may differentiate the tracks of the indications of drift corresponding to the actual drift or to the divided drift, that is to say one may control the nature of the radial deviations by a well-known electronic switching device or electronic cycle counter 75 (sense of the deviations, luminosity, particular oscillation, etc.). By applying, for example, a fraction of the switching voltage of the apparatus 75 to the grid circuit at the input to the impulse generator apparatus or in the amplifier 62', one can obtain different amplitudes for the indications of actual and divided drift.

Fig. 11 shows an example of a comparator circuit in which the drift is multiplied by 10. Portions A and C of the circuit will not be described in detail since they may be the same as those of Fig. 10. In portion B of the circuit, the reference frequency brought back to 100 kc./s. is divided by 10 by means of an appropriate circuit in order to obtain the reference frequency of 10 kc./s. of the comparator 74. The circuit, shown as one example, comprises a frequency changer stage 60', supplied by an oscillator 61' of 90 kc./s. In order to obtain a division and not a mere change in frequency, this oscillator is synchronized on a harmonic of the beat frequency 10 kc./s., this harmonic for example being obtained by means of the multipliers 63' and 64'.

In order to multiply the drift appearing in the frequency to be observed, brought back to 100 kc./s., this drift will at first be carried back, without modification of its absolute value, to a frequency of 10 kc./s., which gives 10 kc./s.$+\Delta f$. To do that, one makes the frequency of 100 kc./s. of the path to be observed beat with the reference frequency 90 kc./s. coming from the oscillator 61', which has just created a change in frequency simultaneously along two paths using the same oscillator.

After amplification at 62', the oscillation of 10 kc./s.$+\Delta f$ may be directly applied on the comparator 74 through the wire 80, in order to show the actual drift.

In order to obtain a multiplication of the drift by 10, one may, for example, use a procedure analogous to that of Fig. 9. The oscillation derived from the amplifier 62' is multiplied by 10 by means of multiplier stages 83 and 84. The frequency 100 kc./s.$+10\Delta f$ thus obtained is brought back to 10 kc./s.$+10\Delta f$ in the mixer 85 by making it beat with the 90 kc./s. of reference emitted by the oscillator 61'. This oscillation of 10 kc./s.$+10\Delta f$ may be applied on the comparator 74 at the output of the amplifier 86 and thus permits one to perceive the drift, multiplied by a factor of 10.

One should note that no switch is here needed in order to obtain simultaneously the two observations on the apparatus 74, since the connecting wires are independent, and that they may be applied, after having been transformed into a series of impulses, either directly as modulation on the sweep furnished by the reference frequency, or by two different modulations of the cathode ray tube circuits. One of the indications may nevertheless be omitted at will by disconnecting the connecting wire thereof.

It should be understood that one may use several stages of drift multiplication or division in cascade in order to obtain, when necessary, large factors of multiplication or division. In other words, one may construct, by the processes disclosed by this present invention, apparatus capable of showing drifts of any value, very large or very small, which will also show this in an almost instantaneous manner.

It should be also understood that one may combine the drift divider and multiplier circuits in such a way as to realize a single measuring apparatus adaptable to all quantities of drifts and phases. Fig. 12 shows by way of example, an example of such a measuring apparatus more particularly arranged for the comparison of an incident frequency with a reference frequency in order to deduce therefrom the relative drift in requency, while Fig. 13 (later described) gives as one possible embodiment, an example of such a measuring apparatus more particularly arranged for the study of the dephasing characteristics of a network or circuit.

Fig. 12 shows schematically an indicator of drift arranged to function for example at 30 to 240 kc./s. without a variable frequency oscillator. In this figure the oscillator 102 generates the frequency of 30 kc./s. destined to serve on the one hand as a time basis for the indicator 110, for example, a cathode ray tube, by means of the circular sweep circuit 106 and on the other hand as the reference frequency for various other different parts of the apparatus, in the first place for the first frequency changer at the input 96 after multiplication by the factor 10 in the circuit 95, and in the second place for producing the reference frequency of 270 kc./s. for the mixers 101 and 103 after multiplication by the factor 9 in a suitable circuit 100.

Reference numeral 91 represents the generator of standard frequency F connected to the point of input 93, of the apparatus. Reference numeral 92 shows the oscillator to be observed having a frequency $F+\Delta F$, connected to the point 94 of the apparatus. Frequency F arriving at the point 93 is brought back to the frequency F+300 kc./s. The mixer 96 permits one to obtain this frequency F+300 kc./s. by means of the fixed frequency of 300 kc./s. coming from the multiplier 95 and by means of the incoming frequency F derived from 91. The frequency F+300 kc./s. will be between 330 and 540 kc./s. because the average frequency provided for this apparatus is 300 kc./s. A suitable filter 97, of a type well known in the art, permits one to eliminate, on the one hand, the harmonics of the frequency F+300 kc./s. and on the other hand, the frequency F−300 kc./s.

The frequency leaving the filter 97 is sent into the mixer 98, thus permitting one to obtain the average frequency 300 kc./s.+ΔF.

The drift divided by a factor of 10, is obtained on the indicator 113 by means of the divider circuit 105 acting upon the frequency 300 kc./s.+ΔF. The resulting frequency of 30 kc./s.+$\frac{1}{10}$ΔF excites the impulse generator 109 which affects the sweep circuit of the indicator 113, which may conveniently be a cathode ray tube. The combined drift will be shown on the indicator 112 by lowering the frequency of 300 kc./s.+ΔF to 30 kc./s.+ΔF by means of the mixer 101, supplied by the frequency of 270 kc./s. obtained from the oscillator 102 via the multiplier 100. The frequency of 30 kc./s.+ΔF supplies the impulse generator 108 which in turn actuates the sweep circuit of the indicator 112. The drift multiplied by a factor of 10, is obtained by previously taking off a portion of the frequency 30 kc./s.+Δf at the output of the mixer 101 and then multiplying it by 10 in the multiplier 104, in order to obtain 300 kc./s.+10Δf. Therefore one lowers this frequency to 30 kc./s.+10Δf by making it beat with the reference frequency of 270 kc./s. supplied by the multiplier 100. The thus lowered frequency supplies the impulse generator 107 which in turn actuates the sweep circuit of the indicator 111.

In order to obtain a zero setting of reading, a dephaser of any appropriate type is provided at 99; this dephaser may alternatively be placed at 114, but one should note that at 99, the dephasing effect produced will be multiplied by the circuit 95.

In the circuit of Fig. 13 which shows more particularly an application for phase measurement, the elements corresponding to those of the circuit of Fig. 12 are designated by the same reference numbers, therefore there is only described the portions of the circuit different from those of Fig. 12.

The range of frequencies given, by way of illustration only, for Fig. 13 is from 15 to 75 kc./s. The circuit to be observed, 124, is inserted between the terminals 93 and 94. The measuring generator 91 feeds, as before, terminal 93.

The oscillator 115, of a fixed frequency of 100 kc./s., feeds the mixer 116, in order to obtain, by beating with the frequency F coming from the measuring oscillator 91, a frequency of F+100 kc./s., filtered at 117 in order to eliminate the image frequency and the harmonics of the frequency F+100 kc./s. The frequency F+100 kc./s. simultaneously supplies the two mixers 118 and 98, which permits one to obtain on the one hand a frequency of 100 kc./s., and on the other hand a frequency of 100 kc./s.+φ, from the frequency F coming from the point of entry 93 and also frequency F which has been displaced at an angle φ by its passage through the network 124.

The mixer 118 supplies a divider circuit 120, permitting one to obtain the reference frequency 10 kc./s., this latter serving to feed on one hand the circular sweep circuit, 106, of the indicator 110 and, on the other hand the multiplier 100, this last furnishing the reference frequency of 90 kc./s. needed for the mixers 101 and 103 as well as for the multiplier 122.

The circuits assuring the indication of the phase angles φ on the apparatus 111, 112 and 113, with suitably multiplied values, fundamental and divided respectively, are the same as in the case of Fig. 12, and a possibility of resetting to zero is furnished by a suitable dephaser which may be placed either at 119 or at the point 121 according to the degree of function desired.

With this apparatus, it is also possible to obtain an electronic tracing affording a scale of reference, according to well-known methods, by using cathode ray oscillographs 112 and 111. This scale, from 10° to 10° on the tube 112 and of 1° to 1° on the tube 111, is obtained by multiplying by a factor of 4 the reference frequency of 90 kc./s. in the stage 112 in order to give a reference frequency of 360 kc./s. This frequency feeds through multiplier 122 the impulse generator at 360 kc./s. 123 which latter in turn modulates the beams of the tubes 111 and 112 in a different manner from that of the other impulse generators, in order clearly to differentiate the scales for the phase readings.

The indicator 113 can also be provided with an electrically produced circular scale divided in scale elements reaching from 360° to 360°, by means of an auxiliary modulation by an impulse generator excited with a reference frequency of 100 kc./s., this latter being obtained by multiplying the reference frequency of 10 kc./s.

It is clear that in the various circuits shown by way of illustrating certain embodiments, the details of the structures and detailed operation of the elements comprising them have not been shown or described, since these details are well known in the art.

It is also clear that this invention is not limited to these specific examples, but on the contrary is capable of numerous modifications and adaptations without departing from the scope thereof. Other combinations of drift divider and multiplier circuits will be apparent to one skilled in the art. Other applications may be made thereof, for example in vernier circuits or for phase meters (radiogoniometers) or for frequency indicators (receivers for supervising transmissions proceeding over a wide range of wave lengths) or even in circuits permitting one to observe a portion of a scale of waves upon a single sweep circuit of a cathode ray oscillograph, or to furnish indications consisting of several scales of waves upon a single sweep circuit of the cathode ray oscillograph (monitoring receivers) etc. It is also clear that the circuits for frequency changing as shown in Figs. 12 and 13, can also be used in association with other types of circuits.

What is claimed is:

1. Frequency drift comparing system including a source of first frequency, the drift of which is to be compared, a source of standard second frequency, means for multiplying said first frequency by a factor K, means for multiplying said second frequency by a factor K+1, means for mixing said frequencies after multiplication, comparator means fed by the output of said mixing means and switching means for predeterminedly feeding to said comparator means a selected one of said unmultiplied frequencies, whereby the drift of said first frequency appears multiplied by one of said factors.

2. Method of measuring the drift of a frequency derived from a first source relative to a standard frequency derived from a second source which includes the steps of multiplying said first frequency by a factor K, multiplying said second frequency by a factor $K+1$, mixing the resultant frequencies, comparing the resultants of the mixed frequencies with the respective original frequencies, and observing the drifts as a frequency representing the original frequency multiplied by one of said factors.

3. System according to claim 1, in which there are also provided means for multiplying the standard frequency by K and means for multiplying the frequency to be compared by $K+n$, where $n$ is a positive integer greater than unity, whereby the mixed frequencies yield a multiple of the original standard frequency plus $K+n$ times the drift frequency.

4. System for comparing frequency drift including a first source of standard frequency and a second source of drifting frequency to be compared, means for multiplying said standard frequency by a positive factor K, means for mixing said multiplied frequency and the frequency from said second source, and means for dividing the output of said mixing means by said factor K, whereby the output includes the frequency to be compared plus the drift frequency divided by said factor K.

5. Method of measuring the drift of a given frequency in a scale reduced by a known factor including the steps of generating a standard frequency equal to the means value of said given frequency, multiplying said standard frequency by a factor $K+1$, mixing said multiplied frequency and said given frequency so as to yield a frequency K times said given frequency and dividing the resultant of said mixing by a factor K, and observing the drift in the resultant of said division as a frequency which is 1/K times the original drift frequency.

6. Frequency comparing apparatus having a self stabilizing frequency divider assembly for use in comparing frequency drift, said assembly including a frequency divider, an oscillator actuating said divider so as to beat therein with a given frequency subject to drift, frequency multiplying means actuated by a portion of the output of said divider and acting to raise the output frequency to the value of the frequency of said oscillator, means conducting said multiplied frequency to said oscillator, whereby said oscillator is synchronized at a predetermined frequency, and comparator means actuated by another portion of the output of said frequency divider.

7. Method of dividing a given frequency and the drift of said frequency, including the steps of generating a second frequency differing from the mean value of said frequency by a value smaller than the value of said given frequency, beating said two frequencies together so as to produce a beat frequency of lower value, multiplying the beat frequency so produced to the mean value of said second frequency and stabilizing said second frequency therewith.

8. Frequency drift multiplier and comparator, including a first mixer, means for introducing therein a given frequency subject to drift, $Kf+\Delta$, and a frequency $(K-1)f$ derived from a reference frequency $Kf$, means for multiplying the output of said first mixer by $(K-1)$, a second mixer and means for introducing therein said last-mentioned multiplied output and said given frequency, whereby the output of said second mixer yields a frequency $f+(K-2)\Delta$.

9. Frequency drift multiplier and comparator, including a first mixer, means for introducing therein a given frequency subject to drift $Kf+\Delta$, and a frequency $(K-1)f$ derived from a reference frequency $Kf$, means for multiplying the output of said first mixer by K, a second mixer and means for introducing therein said last-mentioned multiplied frequency and said frequency $(K-1)f$, whereby the output of said second mixer yields a frequency $f+K\Delta$.

10. Phase measuring apparatus including a first mixer, means for feeding thereto a standard frequency and the output of a fixed oscillator, a second and a third mixer, means for feeding to said second and third mixers the output of said first mixer, means for feeding to said second mixer said standard frequency, means for feeding to said third mixer a given frequency subject to phase deviation, and means for dividing, multiplying and comparing the outputs of said second and third mixers.

11. Apparatus according to claim 10 and also including a dephaser placed between said second mixer and said dividing means.

12. Apparatus according to claim 10 and also including a dephaser placed between said dividing and said multiplying means.

13. Method of measuring the drift of a frequency derived from a first source relative to a standard frequency derived from a second source which includes the steps of multiplying said first frequency by a factor K, multiplying said second frequency by a factor $K-n$, $n$ being a positive integer greater than unity, mixing the resultant frequencies, comparing the resultants of the mixed frequencies with the respective original frequencies, and observing the drifts as a frequency representing the original frequency multiplied by one of said factors, whereby the resultant of the mixed frequencies includes a frequency of the value K times the standard frequency.

14. Frequency-comparing apparatus having a self-stabilizing frequency divider assembly for use in comparing frequency drift, said assembly including a frequency divider, arranged to beat with a given frequency subject to drift, frequency-multiplying means actuated by a portion of the output of said divider, means conducting said multiplied frequency to said frequency divider, whereby said frequency divider is synchronized at a predetermined frequency, and comparator means actuated by another portion of the output of said frequency divider.

RENAUD KOECHLIN.

REFERENCES CITED

The following references are of record in the file of this patent:

UNITED STATES PATENTS

| Number | Name | Date |
| --- | --- | --- |
| 2,305,614 | Goldstein | Dec. 22, 1942 |
| 2,121,359 | Luck et al. | June 21, 1938 |
| 2,234,830 | Norton | Mar. 11, 1941 |
| 2,333,322 | Levy | Nov. 2, 1943 |